United States Patent [19]

Miller

[11] Patent Number: 5,272,285

[45] Date of Patent: Dec. 21, 1993

[54] SOUND ATTENUATING MACHINERY COVER

[75] Inventor: T. Scott Miller, Henderson, Ky.

[73] Assignee: Scott Mfg., Inc., Henderson, Ky.

[21] Appl. No.: 932,803

[22] Filed: Aug. 20, 1992

[51] Int. Cl.$^5$ .............................................. H02K 5/24
[52] U.S. Cl. .................................................... 181/202
[58] Field of Search ............... 181/200, 201, 202, 203, 181/204, 205, 208, 229, 230, 403; 417/312, 313, 572; 62/296

[56] References Cited

U.S. PATENT DOCUMENTS

| | | | |
|---|---|---|---|
| 2,949,975 | 8/1960 | Plummer | 181/230 |
| 3,815,705 | 6/1974 | Bennett | 181/230 |
| 4,624,339 | 11/1986 | Marcel et al. | 181/230 |
| 5,151,018 | 9/1992 | Clendenin et al. | 181/202 X |

Primary Examiner—Michael L. Gellner
Assistant Examiner—Khanh Dang
Attorney, Agent, or Firm—Maurice L. Miller, Jr.

[57] ABSTRACT

A slip over, sound muffling cover for a machine such as a compressor is disclosed which includes an outer layer of relatively rigid, bendable, resilient material capable of being distorted and returned to its desired shape, and an inner layer of flexible, sound absorbent material. The outer layer includes a cap having a broad surface and a pair of open sided trays attached on corresponding ends thereof to the broad surface so that, under normal circumstances, the open sides of the trays face one another. Each of the trays contains a pair of elongated flanges on opposite side edges thereof, pairs of such flanges which oppose one another on the same side of the trays are closable against one another to enclose a machine in the sound absorbent material. The trays may be semi-cylindrically shaped wherein when closed against one another, they form a cylindrically shaped enclosure about a similarly shaped compressor with the cap closing one end of the enclosure over the top of the machine, and with the lower end of the enclosure being open. Preferably, the outer layer is constructed of molded, closed cell polyethelene and the inner layer is constructed of spun fiberglass and/or plastic foam.

23 Claims, 2 Drawing Sheets

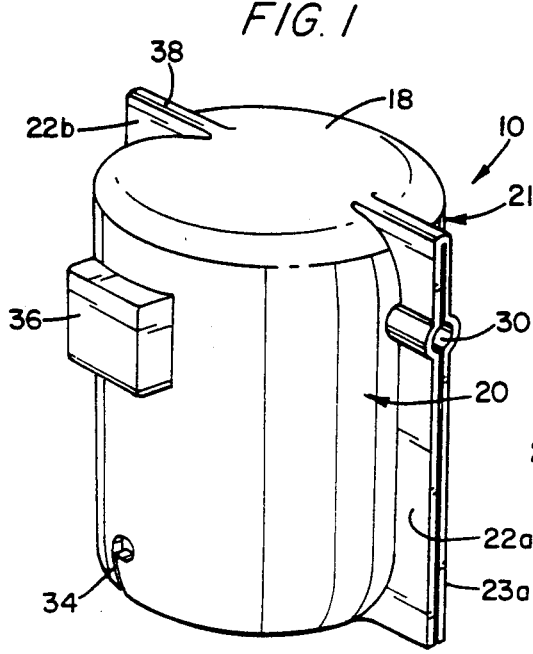
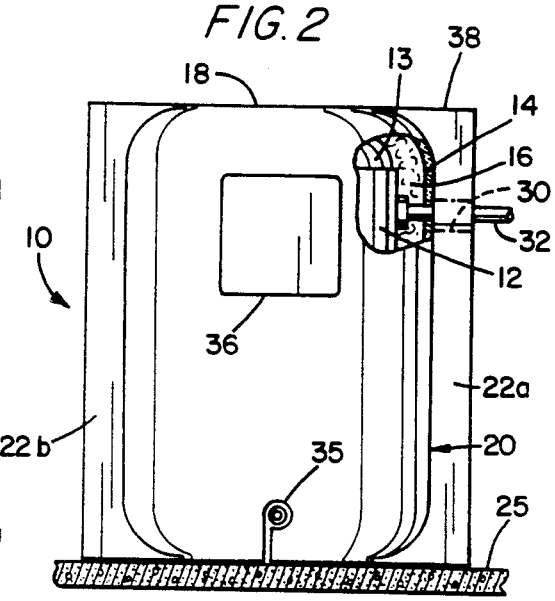
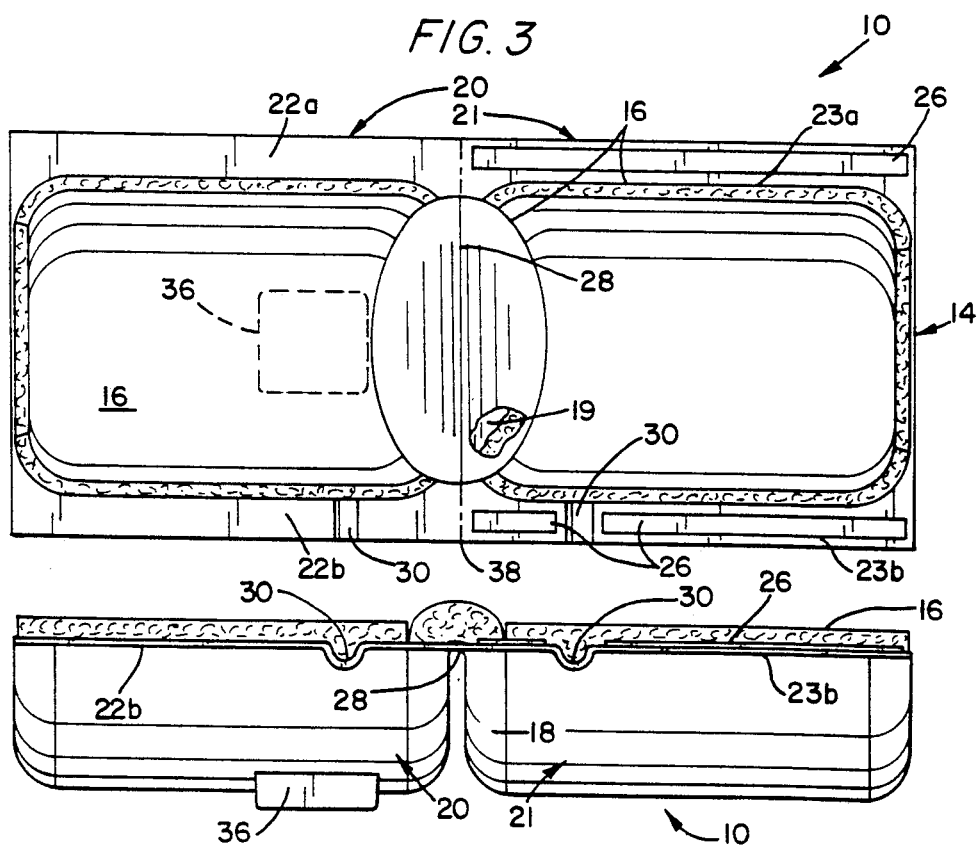

SOUND ATTENUATING MACHINERY COVER

BACKGROUND OF THE INVENTION

Broadly speaking, this invention relates to covers for use on various types of machines, such as compressors, in order to dampen and reduce noise emitted by such machines. More specifically, the invention relates to relatively rigid laminated covers tailored to the approximate shape of the machine to be covered, which can readily be slipped over the machine and thereafter closed to encase the machine in a sound absorbent material.

It has been found that prolonged exposure to noise generated by various types of machines, such as compressors, can have harmful effects upon the persons so exposed. For this reason, various types of covers and housings have been developed in the prior art to be applied about such machines to reduce the noise generated thereby.

See, for example, U.S. Pat. No. 3,896,897 issued to E. O. Hillbush, Jr. on Jul. 29, 1975 and U.S. Pat. No. 2,949,975 issued to W. A. Plummer on Aug. 23, 1960, both of which patents disclose highly flexible, laminate, blanket-like covers adapted for wrapping about the body of a pneumatic tool such as a jack hammer or air drill. The cover of Hillbush, Jr. includes an inner layer of porus or open cell polyurethane sponge, a middle layer of lead, tin, bismuth, zinc, copper, or aluminum sheet which is annealed sufficiently so that it can be shaped around a pneumatic tool body and so that it will not mechanically resonate at the vibratory frequency of the tool. The subject cover also includes an outer layer of cloth, such as neoprene coated with nylon, or other elastomeric material such as rubber, butyl or acrylonitrile, which can withstand the type of shock and distortion to be encountered when applied to such tools.

The cover of Plummer includes an inner jacket of flexible material having a main body layer of sound absorbing material such as comminuted wood fibers overlayed with a layer of reinforcing fibrous material such as spun fiberglass. The two layers of wood fibers and fiberglass are held between inner and outer fabric cover sheets.

The covers of both of these patents are relatively complex laminate structures and are not sufficiently rigid to retain a given shape separate and apart from the tool body about which they are to be wrapped. Also, the wrapping of such a highly flexible sound absorbent cover about machinery is cumbersome. By contrast, it would be desirable to have a cover which is sufficiently rigid to retain a desired form, yet still be flexible and resilient enough to be bent both for slipping over the top of a machine, for ease of installation and removal, and for laying open for stacking and nesting any number of such covers successively, one within another, for saving space in the shipping and storage of quantities thereof.

By means of my invention, these and other shortcomings of prior art muffler covers are substantially overcome.

SUMMARY OF THE INVENTION

It is an object of my invention to provide a sound attenuating cover for a machine such as a compressor.

It is another object of my invention to provide such a cover which can be adapted to encase a machine therein in close fitting and conforming relationship and which can be laid open such that any number of such cover can be stacked and nested one within another for convenience in shipping and storing quantities thereof.

It is another object of my invention to provide a sound muffling cover for a machine which is easily applied to such machine and which is weather resistant.

Briefly, in accordance with the invention I provide a sound attenuating cover for a machine such as a compressor. To this end, I provide an outer layer of relatively rigid, bendable, resilient material. The outer layer includes a cap having a relatively broad surface adapted to fit over an upper surface of a machine. A pair of open sided trays are attached on corresponding ends thereof to the broad surface of the cap such that the open sides of the trays normally oppose one another. A pair of elongated, outwardly projecting flanges are attached along opposite side edges of each of the trays. Pairs of the flanges which are located on corresponding sides of the trays are closable against one another to form an enclosure about the machine. The enclosure is bound by the trays and is closed on one end by the cap and open on the other end. An inner layer of flexible, sound absorbent material is attached to the outer layer and covers the interior surfaces of the enclosure. Means is provided for securing opposing ones of the flanges together for maintaining the enclosure closed about the machine.

These and other objects, features and advantages of my invention will become apparent to those skilled in the art from the following detailed description and attached drawings upon which, by way of example, only a preferred embodiment of my invention is illustrated

BRIEF DESCRIPTION OF THE DRAWINGS

FIG. 1 shows a perspective view of a sound attenuating cover for a machine such as a compressor, thus illustrating a preferred embodiment of my invention.

FIG. 2 shows a side elevation view of the cover of FIG. 1 with a portion torn away to show the nature of the cover and a compressor encased therein.

FIG. 3 shows a plan view of the cover of FIGS. 1-2 laid open to show the interior thereof.

FIG. 4 shows a side elevation view of the cover of FIGS. 1-3, the cover being laid open the same as in FIG. 3.

DESCRIPTION OF THE PREFERRED EMBODIMENT

Figure 5:
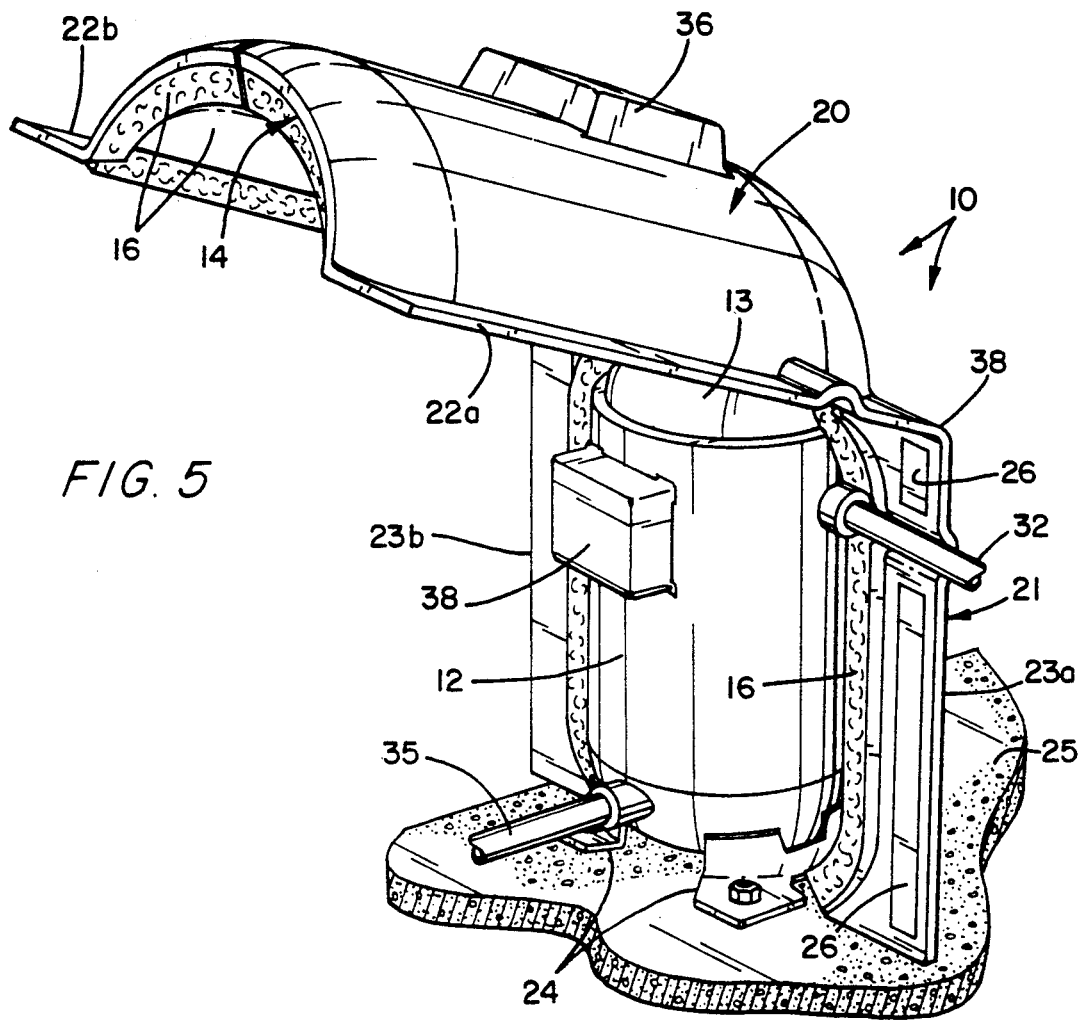
FIG. 5 shows a perspective view of the cover of FIGS. 1-4 as the same is being applied about a compressor.

Referring now to the drawing figures there is shown, in a preferred embodiment of my invention, a sound attenuating cover, generally designated 10, for covering a machine such as a compressor 12. The cover 10 is constructed of an outer layer 14 of relatively rigid, bendable, resilient material and an inner layer 16 of flexible, sound absorbent material. The outer layer 14 includes an upper surface portion or cap 18 having a relatively broad circularly shaped surface 19, as compared to the thickness of the layer 14, which cap 18 is sized and shaped to fit over an upper surface or dome 13 of the compressor 12. The layer 14 also includes a pair of open sided, semi-cylindrically shaped flaps or trays 20 and 21 which are attached on corresponding rounded ends thereof to and around the broad surface 19. The trays 20 and 21 thus depend from what will be considered an underside surface 19 of the cap 18 so as to normally extend approximately perpendicularly downward therefrom such that the open sides of the trays 20 and 21 normally face or oppose one another. Two pairs of elongated, radially outwardly projecting flanges 22a, b and 23a, b are attached to and along the entire lengths of opposite side edges of the trays 20 and 21, respectively. Normally, the pairs of the flanges 22a, 23a and 22b, 23b which are located on the same sides of each of the trays 20 and 21 oppose one another such that, when the cover 10 is initially placed over the compressor 12 as in FIG. 5, opposing ones of the flanges can be manually closed flush against one another along the sides of the trays 20 and 21 to thus enclose the compressor 12 as shown in FIGS. 1-2. The cover 10 thus forms a generally cylindrically shaped enclosure about the compressor 12 which is bounded by the trays 20 and 21. The cylindrically shaped enclosure is closed on its upper end, as viewed, by the cap 18 and is open on its lower end, through which a base 24 of the compressor 12 projects for attachment to its supporting surface 25.

The inner layer 16 is attached to and completely covers the underside surface 19 of the cap 18 and the interior concave surfaces of the trays 20 and 21 such that essentially all exposed surfaces of the compressor 12 can be encased therein when the cover 10 is applied thereover and opposing ones of the flanges 22 are closed flush against one another. The layer 16 is preferably constructed of fiberglass or other flexible and suitably sound absorbent material and is attached to the interior surfaces of the outer layer 14 as by means of glue, pressure sensitive adhesive or the like. In the alternative, the inner layer 16 can be constructed of a conventional molded plastic foam material such as, for example, polyurethane.

The cover 10 also includes means for securing opposing pairs of the flanges 22a, 23a and 22b, 23b tightly together after the cover 10 has been loosely fitted over the compressor 12 so as to secure the cover 10 in a closed condition about the compressor 12. One such means includes a suitable pressure sensitive adhesive applied to and along at least one of each opposable pair of flanges 22 and 23. Such adhesive should preferably be covered by removable protective strips 26 such as, for example, a polyethelene or paper release liner, to prevent accidental contact between the adhesive on one of the opposing surfaces of the flanges with its opposing flange before the cover 10 is placed over the compressor 12 and/or before it is properly positioned thereon. Once the cover 10 is properly positioned on the compressor 12, the paper strips 26 can be removed and opposing pairs of the flanges 22a, b and 23a, b can be secured by using a thumb and forefinger to squeeze them together in successive actions while moving a hand along their entire lengths.

Figure 6:
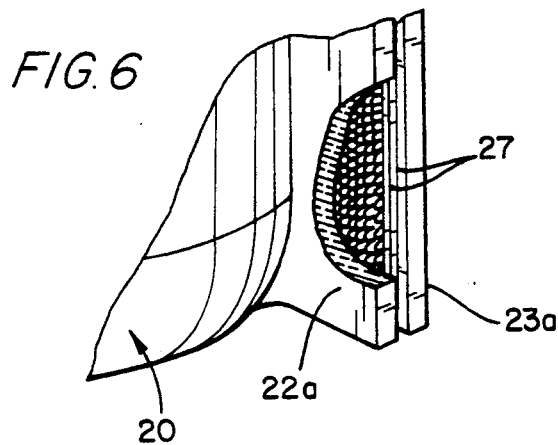
FIG. 6 shows a fragmented perspective view of a portion of a sound attenuating cover, similar to the cover of FIGS. 1-5, except that it employs hook and loop pile materials as means for releasably securing portions of the cover together to securely enclose a machine.

One difficulty encountered using pressure sensitive adhesive is that the cover 10 must be torn and otherwise damaged or destroyed in order to remove it from its secured condition on the compressor 12 as, for example, when maintenance, repair or replacement of the compressor 12 is required. To avoid this problem another suitable means for securing opposing pairs of the flanges 22a, b and 23a, b together is hook and loop pile material 27 such as that sold under the VELCRO trademark, as shown in FIG. 6. In this example, hook pile is suitably attached to one of the opposing pairs of the flanges 22a or 23a and loop pile is likewise attached to the other opposing flange. The same is true of the opposing flanges 22b and 23b on the opposite side of the trays 20 and 21. Such means will allow opposing pairs of the flanges 22a, b and 23a, b to be removably secured so that the cover 10 can be installed, removed without damage, and reused as desired. Of course, other suitable and well known means for removably securing opposing pairs of the flanges 22a, b and 23a, b together such as, for example, snaps or other suitable mechanical fasteners can also be used without departing from the scope of my invention.

Referring now specifically to FIGS. 3-4, the cover 10 is shown in a completely open condition wherein the trays 20 and 21 are aligned end to end with the cap 18 being bent back upon itself along a transversely extending fold line 28. This open formation permits any number of such covers 10 of the same size and shape to be stacked and nested one within another for convenience in shipping and storing quantities thereof.

I recommend that the material from which the outer layer 14 is constructed be non-woven such as molded, closed cell plastic. A molded, closed cell, cross linked foam such as polyethelene or the like is preferred because it is a sufficiently rigid, yet bendable and resilient enough for the disclosed purpose. It is also very light in weight and water repellent. Where such foam materials are employed, the cap 18, trays 20 and 21 and flanges 22a, b and 23a, b can be molded into a single unitary structure, wherein those components are integrally attached to one another.

Notice that opposing ones of the flanges 22a, 23a and 22b, 23b can be molded or otherwise formed to provide for access openings 30 between opposing pairs when closed to allow inlet and/or outlet lines 32 to or from the compressor 12 to pass through. Similarly other apertures such as at 34 can be provided through a base portion of one or both of the trays 20 and 21, to permit passage of a compressor line 35 therethrough as needed. Also a hollow rectangular projection such as at 36 can be formed in one or both of the trays 20 and 21 as needed to house and conform to a junction box or other structural part which projects from the side of the compressor 12. It will be appreciated that, in the present example, opposing ones of the flanges 22a 23a and 22b, 23b are joined together adjacent the cap 18 as at 38 (FIG. 3). Thus, in the present example, opposing pairs of the flanges 22a, 23a and 22b, 23b which are located on the same side of the cover 10 form one continuous, elongated strip running essentially the length of the cover 10 when the trays 20 and 21 are laid open as shown in FIGS. 3-4. Accordingly when these opposing pairs of the flanges are joined, the strip is bent double along a bend 38, adjacent the cap 18. It is not essential that opposing ones of the flanges be joined together adjacent the cap 18 and such opposing flanges could be entirely separate distinct components prior to joinder thereof.

Although the present invention has been described with respect to specific details of certain preferred embodiments thereof, it is not intended that such details limit the scope of the following claims other than as expressly set forth therein.

I claim:

1. A sound attenuating cover for a machine such as a compressor, said cover comprising
   an outer layer of relatively rigid, bendable, resilient material including
   a cap having a relatively broad surface adapted to fit over an upper surface of a machine,
   a pair of open sided trays attached on corresponding ends thereof to said broad surface such that the open sides of said trays normally oppose one another,
   a pair of elongated, outwardly projecting flanges attached along opposite side edges of each of said trays, pairs of said flanges which are located on corresponding sides of said trays being closable against one another to form an enclosure about said machine, said enclosure being bounded by said trays, being closed on one end by said cap and being open on the other end,
   an inner layer of flexible, sound absorbent material attached to said outer layer and covering the interior surfaces of said enclosure, and
   means for securing opposing ones of said flanges together for maintaining said enclosure closed about said machine.

2. The cover of claim 1 wherein said trays are semi-cylindrically shaped, said flanges projecting radially outward from said trays, said enclosure being generally cylindrical in shape.

3. The cover of claim 1 wherein said cap is rounded.

4. The cover of claim 1 wherein said cap is essentially circular in shape.

5. The cover of claim 1 wherein said trays are resiliently tiltable away from one another such that they can be aligned end to end, said cap being resiliently bendable across a mid-portion thereof transverse to such end to end alignment of said trays, whereby a plurality of said covers can be stacked one upon another in close conforming relationship for convenient shipping and storage.

6. The cover of claim 1 wherein said outer layer comprises non-woven material.

7. The cover of claim 1 wherein said outer layer comprises a molded, closed cell material.

8. The cover of claim 1 wherein said outer layer comprises a plastic.

9. The cover of claim 1 wherein said outer layer comprises a molded closed cell foam.

10. The cover of claim 1 wherein said outer layer comprises a molded closed cell polyethelene.

11. The cover of claim 1 wherein said inner layer comprises fiber glass.

12. The cover of claim 1 wherein said inner layer comprises a plastic foam.

13. The cover of claim 12 wherein said foam comprises polyurethane.

14. The cover of claim 1 wherein said securing means comprises a pressure sensitive adhesive applied to at least one of each of said opposing pairs of said flanges.

15. The cover of claim 1 wherein said securing means comprises means for releasbly securing opposing ones of said flanges together.

16. The cover of claim 1 wherein said securing means comprises hook and loop pile materials respectively attached to opposing ones of said flanges.

17. The cover of claim 1 wherein said opposing ones of said flanges are joined along opposite sides of said cap.

18. The cover of claim 1 wherein said outer layer defines at least one aperture therethrough through which external access to said machine can be had.

19. The cover of claim 1 wherein at least one of said trays defines a hollow outwardly projecting surface portion which communicates with the interior of said enclosure for confining a conforming outwardly projecting surface portion of said machine therein when opposing ones of said flanges are closed to enclose said machine between said trays.

20. The cover of claim 1 wherein said cap and trays and said flanges and trays are integrally attached.

21. The cover of claim 1 wherein said inner layer is adhesively attached to said outer layer.

22. A sound attenuating cover for a machine such as a compressor, said cover comprising
   an outer layer of relatively rigid, bendable, resilient, non-woven material including
   a cap having a broad surface,
   a pair of semi-cylindrically shaped flaps attached on corresponding rounded ends thereof to said surface, and
   a pair of elongated, radially projecting flanges attached to opposite side edges of each of said flaps, pairs of said flanges located on the same sides of said flaps being closable against one another to form a hollow cylindrically shaped body bounded by said flaps around a machine whose sound is to be muffled, said body being closed on one end by said cap and being open on the other end,
   an inner layer of flexible, sound absorbent material attached to and covering said broad surface and the concave surfaces of said flaps, and
   means for securing opposing ones of said flanges together to maintain a machine securely encased in said sound absorbent material within said body, said flaps being tiltable outwardly from one another to facilitate placement of said cover over said machine.

23. A sound attenuating cover for a machine such as a compressor, said cover comprising
   an outer layer of relatively rigid, bendable, resilient material including
   a disc shaped cap adapted to fit over an upper surface of a machine,
   a pair of semi-cylindrically shaped trays, each of said trays having a convex exterior surface and a concave interior surface, semi-cylindrically shaped upper and lower ends, and axially extending opposite sides, corresponding ends of said trays being attached to and along peripheral edge portions of said cap such that said trays, when in their operative positions, extend at right angles from said cap and such that the concave interior surfaces of said trays oppose one another, and
   a pair of elongated, radially outwardly projecting flanges attached to and along the opposite sides of each of said trays, pairs of said flanges which are located opposite one another when said trays are in their operative positions being closable against one another to form a generally cylindrically shaped enclosure around and over said machine, which enclosure is bounded by said pair of trays and said cap,
   an inner layer of flexible, sound absorbent material attached to said outer layer and covering the interior surfaces of said enclosure, and
   means for securing opposing pairs of said flanges together for maintaining said enclosure closed around and over said machine.

* * * * *